(12) United States Patent
Ikeda

(10) Patent No.: US 9,128,454 B2
(45) Date of Patent: Sep. 8, 2015

(54) POWER TRANSMISSION BODY MOUNTING STRUCTURE AND TONER TRANSPORTATION DEVICE

(71) Applicant: KONICA MINOLTA, INC., Tokyo (JP)

(72) Inventor: Hideaki Ikeda, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 163 days.

(21) Appl. No.: 13/631,210

(22) Filed: Sep. 28, 2012

(65) Prior Publication Data

US 2013/0084129 A1 Apr. 4, 2013

(30) Foreign Application Priority Data

Sep. 30, 2011 (JP) ................................. 2011-216649

(51) Int. Cl.
*G03G 21/10* (2006.01)
*F16D 1/108* (2006.01)
(Continued)

(52) U.S. Cl.
CPC .............. *G03G 21/105* (2013.01); *F16D 1/108* (2013.01); *G03G 15/757* (2013.01); *G03G 21/1857* (2013.01); *G03G 2215/0132* (2013.01);
(Continued)

(58) Field of Classification Search
CPC ........... F16D 1/108; F16D 1/10; F16D 1/104; G03G 21/186; G03G 21/1857; G03G 15/757; Y10T 403/7033; Y10T 403/7035; Y10T 403/10; F16H 57/023
See application file for complete search history.

(56) References Cited

U.S. PATENT DOCUMENTS 5,923,931 A * 7/1999 Kishimoto .................... 399/256
6,125,712 A * 10/2000 Kaburagi et al. ........... 74/421 R
6,188,856 B1 2/2001 Sato
(Continued)

FOREIGN PATENT DOCUMENTS

CN 201402371 Y 2/2010
EP 1 172 709 1/2002
(Continued)

OTHER PUBLICATIONS

Notification of Reasons for Refusal mailed Oct. 15, 2013, directed to JP Application No. 2011-216649; 6 pages.
(Continued)

*Primary Examiner* — Clayton E Laballe
*Assistant Examiner* — Peter L Cheng
(74) *Attorney, Agent, or Firm* — Lucas & Mercanti, LLP

(57) ABSTRACT

A gear mounting portion of a rotating shaft includes a shaft portion, with a D-shaped cross-section, engaged with a connecting portion of a gear having a D-shaped cross-section; the connection portion provided with a first hole portion; one flexible portion provided along the axial direction; and a retaining portion provided at a tip of the flexible portion. The retaining portion protrudes outwards with respect to the shaft portion, and the shaft portion is engaged with the connecting portion after the retaining portion has passed through a second hole portion of a hollow shaft. The flexible portion remains bent while the retaining portion passes through the second hole portion of the hollow shaft. Once the shaft portion engages with the first hole portion of the connecting portion, the flexible portion ceases to bend and engages with the gear. As a result, without damaging the rotating shaft, the gear is reliably prevented from coming free from the rotating shaft.

20 Claims, 12 Drawing Sheets

(51) Int. Cl.
  *G03G 21/18* (2006.01)
  *G03G 15/00* (2006.01)
(52) U.S. Cl.
  CPC .............. *Y10T403/10* (2015.01); *Y10T 403/60* (2015.01); *Y10T 403/7033* (2015.01)

(56) References Cited

U.S. PATENT DOCUMENTS

| | | |
|---|---|---|
| 2002/0025183 A1 | 2/2002 | Murakami et al. |
| 2002/0034403 A1* | 3/2002 | Ueno et al. .................... 399/252 |
| 2004/0013445 A1 | 1/2004 | Yamada et al. |
| 2010/0232816 A1 | 9/2010 | Tan et al. |

FOREIGN PATENT DOCUMENTS

| | | | | |
|---|---|---|---|---|
| EP | 1-993-003 A2 | 11/2008 | | |
| JP | 3-126058 | 5/1991 | | |
| JP | 9-325584 | 12/1997 | | |
| JP | 10-63076 | 3/1998 | | |
| JP | 2002-62735 | 2/2002 | | |
| JP | 2002-135522 | 5/2002 | | |
| JP | 2006-113154 | * 4/2006 | ............. G03G 15/00 |

OTHER PUBLICATIONS

Extendend European Search Report dated Feb. 6, 2013, directed to European Application No. 12186551.3; 6 pages.
Chinese Office Action, Application No. 201210363727.7. Mailing Date: Jun. 26, 2014 (7 pages).
English translation of Chinese Office Action, Application No. 201210363727.7. Mailing Date: Jun. 26, 2014 (11 pages).

* cited by examiner

POWER TRANSMISSION BODY MOUNTING STRUCTURE AND TONER TRANSPORTATION DEVICE

This application is based on an application No. 2011-216649 filed in Japan, the contents of which are hereby incorporated by reference.

BACKGROUND OF THE INVENTION (1) Field of the Invention

The present invention is related to a mounting structure for mounting, onto an edge of the rotating shaft, a power transmission body such as a gear or a pulley for transmitting power to the rotating shaft, and to a toner transportation device that includes such a mounting structure.

(2) Description of the Related Art

In some image forming apparatuses that form an image by electrophotography, a toner image formed on the surface of a photoconductor drum is transferred, for example, to an intermediate transfer belt or a recording sheet, after which a cleaning device collects toner remaining on the surface of the photoconductor drum.

Such a cleaning device is provided with a cleaning blade, a housing, and a toner transport screw. The cleaning blade scrapes remaining toner off of the surface of the photoconductor drum and is provided in the housing. The housing stores the toner scraped off by the blade. The toner transport screw transports the toner in the housing in a predetermined direction. The toner that is transported by the toner transport screw is ejected outside of the housing and collected.

The toner transport screw is composed of a rotating shaft along which a spiral transport blade is provided. The transport blade rotates integrally along with the rotating shaft. As a result, toner is transported in a predetermined direction by the transport blade.

One edge of the rotating shaft in the toner transport screw passes through a through-hole provided in a side panel of the housing so as to protrude outside of the housing. A gear with an axial hole is mounted on the protruding edge of the rotating shaft. Having been mounted onto one edge of the rotating shaft, the gear is rotatably supported within the through-hole provided in the side panel of the housing so as to be able to rotate integrally with the rotating shaft. Rotary force from a motor or the like is transmitted to the gear, and rotation of the gear causes the rotating shaft to rotate.

On the inside of the housing, a seal member is provided on the rotating shaft to seal the through-hole. The seal member is formed from an elastic material, such as a sponge, and is fit to the rotating shaft. The seal member is pressed against the side panel around the through-hole by a flange provided on the rotating shaft.

Outside of the housing, the reaction force of the seal member provided in this way causes the gear that is retained against the rotating shaft to be pressed against by the side panel of the housing. This may cause a large force to act on the retaining portion of the rotating shaft that pushes the gear against the side panel of the housing. It thus becomes necessary to adopt a structure such that even if a large force acts on the retaining portion of the rotating shaft, the retaining portion will not easily stop retaining the gear.

In order to retain the gear mounted on the rotating shaft, usage of an E-ring retaining ring is well known. Since an E-ring is mounted in a groove formed at the edge of the rotating shaft, however, it is necessary to form the groove along the entire circumference of the rotating shaft at the edge thereof. The toner transport screw is normally formed by integrally forming the rotating shaft and the transport blade from synthetic resin, the rotating shaft having a small diameter of 3 mm to 5 mm. Forming a groove along the entire circumference of the rotating shaft with this small diameter drastically reduces the strength of the rotating shaft.

As a result, if a large force in the axial direction, directed away from the side panel, is applied to the E-ring from the gear attached to the rotating shaft, the rotating shaft may easily break, making it impossible to retain the gear against the rotating shaft.

Apart from an E-ring, another known method for retaining the gear is to use a snap-fit with a contractible outer diameter at the tip thereof.

Patent Literature 1 (Japanese Patent Application Publication No. 2002-135522) discloses a snap-fit, formed from synthetic resin, that rotatably supports a swinging gear while retaining the swinging gear. The snap-fit disclosed Patent Literature 1 has a conical tip. The tip has a larger outer diameter than the outer diameter of the shaft supporting the swinging gear. A hole is formed along the central axis of the conical tip, and the outer diameter of the tip contracts upon application of external pressure due to contraction of the hole.

When the outer diameter of the tip of the snap-fit contracts due to external pressure, the snap-fit can pass through a gear hole provided along the central axis of the swinging gear. Upon release of the external pressure, the outer diameter of the tip becomes larger than the gear hole, so that the tip engages with the portion of the swinging gear around the gear hole. As a result, the gear is prevented from coming free from the snap-fit.

In order to reliably prevent the swinging gear from coming free from the snap-fit disclosed in Patent Literature 1, the outer diameter of the tip of the snap-fit may be increased so that the area of the tip that is engaged with the swinging gear increases. In this case, however, in order for the tip of the snap-fit to pass through the gear hole in the swinging gear, it is necessary to increase the size of the diameter of the hole provided along the central axis in order for the outer diameter of the tip of the snap-fit to contract greatly.

Increasing the diameter of the hole along the central axis, however, reduces the strength of the entire tip, thus placing a limit on the extent to which the outer diameter of the tip can be caused to contract. The snap-fit disclosed in Patent Literature 1 thus does not allow for an increase in the area of the region where the tip of the snap-fit and the gear engage. Therefore, this snap-fit leads to the risk of not being able to reliably retain a gear on which a large force acts in the axial direction of the rotating shaft, as in the rotating shaft of the toner transport screw in the above-described cleaning device.

SUMMARY OF THE INVENTION

A power transmission body mounting structure according to the present invention is a power transmission body mounting structure in which a power transmission body is mounted onto an end portion of a rotating shaft, comprising: a hollow shaft provided in the power transmission body and provided with an axial hole, the axial hole including a first hole portion with a non-circular cross-section and a second hole portion located closer to a tip of the end portion of the rotating shaft than the first hole portion is; a shaft portion, with a non-circular cross-section, provided in the rotating shaft and engaged with the first hole portion so as to rotate integrally with the power transmission body; a flexible portion provided between the shaft portion and the tip of the rotating shaft; and a retaining portion provided at the tip of the rotating shaft, having a cross-sectional shape allowing for passage through the axial hole, protruding beyond the shaft portion in a direction perpendicular to an axial direction, and engaged with an area near an end of the axial hole, wherein when the power transmission body is mounted onto the rotating shaft, the shaft portion engages with the first hole portion after the retaining portion completely passing through the first hole portion, and while the retaining portion is passing through the second hole portion, the flexible portion contacts with the second hole portion and bends, and once the retaining portion passes completely through the axial hole, the flexible portion ceases to bend so that the retaining portion engages with the area by the end of the axial hole.

A toner transport device according to the present invention comprises: a housing that stores toner; a toner transport screw including a rotating shaft and a transport blade, provided on the rotating shaft, that transports toner within the housing; a power transmission body that transmits power to the rotating shaft; and the above power transmission body mounting structure.

BRIEF DESCRIPTION OF THE DRAWINGS

These and the other objects, advantages and features of the invention will become apparent from the following description thereof taken in conjunction with the accompanying drawings which illustrate specific embodiments of the present invention.

In the drawings.

DESCRIPTION OF THE PREFERRED EMBODIMENTS

The following describes a tandem-type color printer, which is an example of an image forming apparatus provided with a toner transport screw that has a mounting structure for mounting a power transmission body according to an embodiment of the present invention.

Structure of Image Forming Apparatus

Figure 1:
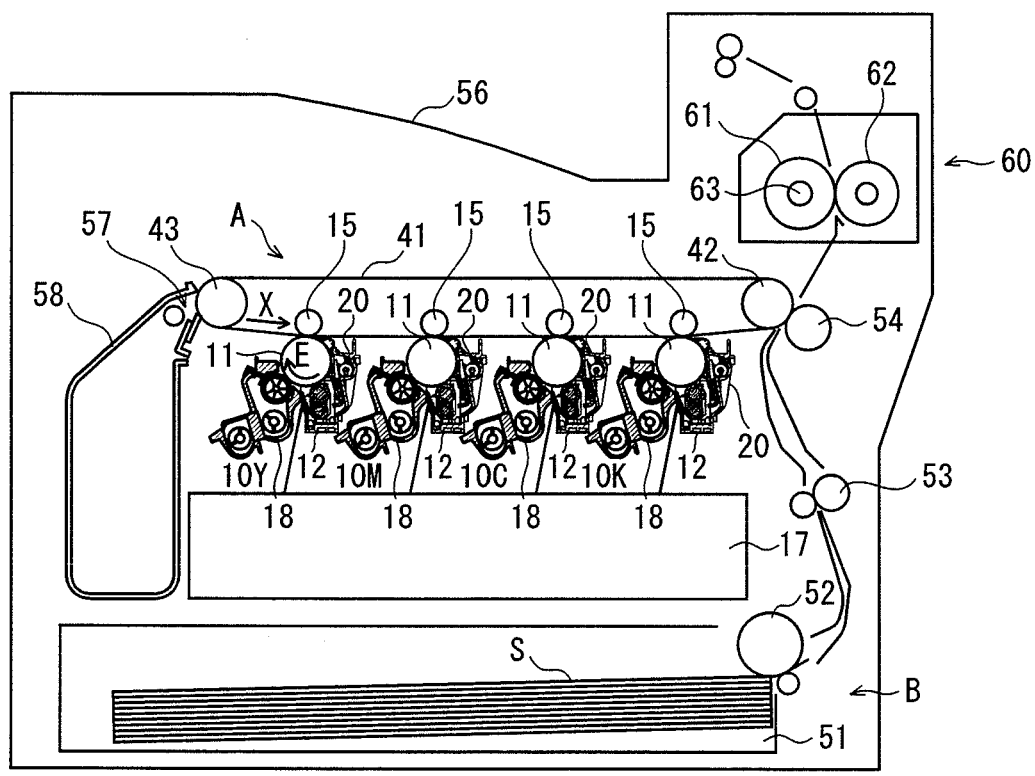
FIG. 1 is a schematic diagram illustrating a tandem-type color printer, which is an example of an image forming apparatus provided with a toner transport screw that has a mounting structure for mounting a power transmission body according to an embodiment of the present invention.

FIG. 1 is a front schematic diagram of a tandem-type color printer (hereinafter simply referred to as a "printer"), illustrating the structure of the printer. Upon receiving an instruction to execute a print job, the printer forms a full-color or a monochrome image based on the instruction on a recording sheet, such as paper or an OHP sheet, using well-known electrophotography.

The printer is provided with an image forming unit A and, below the image forming unit A, a sheet feeder B. The image forming unit A forms a toner image on the recording sheet from the toner colors yellow (Y), magenta (M), cyan (C), and black (K). The sheet feeder B includes a paper cassette 51 storing recording sheets S that are fed to the image forming unit A.

Nearly at the center of the printer, the image forming unit A is provided with an intermediate transfer belt 41 that runs horizontally. The intermediate transfer belt 41 is wound around a pair of belt rollers 42 and 43. The intermediate transfer belt 41 is caused to rotate in the direction indicated by the arrow X by a motor not shown in the figures.

Below the intermediate transfer belt 41, process units 10Y, 10M, 10C, and 10K are provided respectively for the colors Y, M, C and K. The process units are each removable from the apparatus provided with the image forming unit A. The process units 10Y, 10M, 10C, and 10K are provided in this order along the direction of rotation of the lower portion of the intermediate transfer belt 41.

The process units 10Y, 10M, 10C, and 10K each form a toner image of the respective toner color Y, M, C or K on the intermediate transfer belt 41.

Other than using a different color toner, the process units 10Y, 10M, 10C, and 10K have the same structure. Accordingly, the following explanation focuses on the process unit 10Y.

The process unit 10Y is provided with a photoconductor drum 11 disposed rotatably facing the lower portion of the intermediate transfer belt 41. A photosensitive layer is provided along the entire circumferential surface of the photoconductor drum 11 and rotates in the direction shown by the arrow E.

The axis of the photoconductor drum 11 runs along the direction of width of the intermediate transfer belt 41 (from the front of the printer towards the back) and extends in a straight line from the front edge of the printer to the back edge.

Note that hereinafter, the front of the printer and the back of the printer are also simply referred to as the front and the back.

A cleaning device 20 is provided to clean the surface of the photoconductor drum 11 at a point downstream in the rotational direction of the photoconductor drum 11 from the upper side of the photoconductor drum 11 that faces the intermediate transfer belt 41. Details on the structure of the cleaning device 20 are described below.

Further downstream in the rotational direction of the photoconductor drum 11 than the cleaning device 20, a charging roller 12 is provided for uniformly charging the photosensitive layer of the photoconductor drum 11 to a predetermined charge potential. The charging roller 12 charges the photosensitive layer of the photoconductor drum 11 by voltage being applied. Note that the cleaning device 20 and the charging roller 12 constitute an integral structure.

Below all of the process units 10Y, 10M, 10C, and 10K, an exposure device 17 is provided for forming an electrostatic latent image on the surface of the photoconductor drum 11 of each of the process units 10Y, 10M, 10C, and 10K. The exposure device 17 forms the electrostatic latent image by radiating laser light onto the photosensitive layer of each photoconductor drum 11. The exposure device 17 is mounted into the image forming unit A.

By the exposure device 17 radiating laser light, the electrostatic latent image is formed on the surface of the photoconductor drum 11, which has been charged by the charging roller 12.

A developing device 18 is provided downstream in the direction of rotation of the photoconductor drum 11 from the location at which the surface of the photoconductor drum 11 is radiated by laser light. Using toner, the developing device 18 develops the electrostatic latent image formed on the surface of the photoconductor drum 11.

At a point downstream in the direction of rotation of the photoconductor drum 11 from the developing device 18 (above the photoconductor drum 11), a primary transfer roller 15 is provided facing the photoconductor drum 11, with the intermediate transfer belt 41 sandwiched therebetween. The primary transfer roller 15 transfers the toner image developed on the photoconductor drum 11 by the developing device 18 to the outer circumferential surface of the intermediate transfer belt 41 (the lower surface of the intermediate transfer belt 41). The primary transfer roller 15 is mounted into the image forming unit A.

A primary transfer roller 15 is also provided above the photoconductor drum 11 of each of the other process units 10M, 10C, and 10K, sandwiching the lower rotational region of the intermediate transfer belt 41, in order to transfer the images formed on the photoconductor drums 11 to the intermediate transfer belt 41. Each primary transfer roller 15 is mounted into the image forming unit A. The toner images formed on the photoconductor drums 11 are all transferred to the same region on the intermediate transfer belt 41 by the primary transfer rollers 15.

The cleaning device 20, described below, cleans the toner and the like remaining on the surface of the photoconductor drum 11 after the toner image is transferred to the intermediate transfer belt 41.

After the toner images are transferred onto the intermediate transfer belt 41, the intermediate transfer belt 41 transports the toner images to the belt roller 42 provided near the process unit 10K for the toner color K. A secondary transfer roller 54 is provided facing the belt roller 42 with the intermediate transfer belt 41 therebetween. The secondary transfer roller 54 is in contact with the intermediate transfer belt 41 so as to form a transfer nip at the location of contact for transferring the toner images to a recording sheet.

A recording sheet S from the paper cassette 51 provided in the sheet feeder B below is transported to the transfer nip by a feed roller 52. The recording sheet S is transported by a pair of timing rollers 53 in synchronization with the timing at which the toner images formed on the intermediate transfer belt 41 are transported to the transfer nip. When the toner images formed on the intermediate transfer belt 41 are pressed against the recording sheet S that passes through the transfer nip, the toner images are transferred to the recording sheet S due to an electrostatic force from an electrical field formed by the secondary transfer roller 54.

Note that the toner that forms the toner images on the intermediate transfer belt 41 is not entirely transferred to the recording sheet by the electrical field of the secondary transfer roller 54. Rather, a portion of the toner remains on the intermediate transfer belt 41. Such residual toner on the intermediate transfer belt 41 is transported to the belt roller 43 provided near the process unit 10Y. A residual toner removal device 57 is provided facing the belt roller 43 with the intermediate transfer belt 41 therebetween. The residual toner removal device 57 removes the residual toner on the intermediate transfer belt 41 both electrically and mechanically. The toner that is removed is stored as waste toner in a waste toner bottle 58.

After passing through the transfer nip, the recording sheet S is transported to a fixing device 60 provided in the upper part of the image forming unit A. The fixing device 60 is provided with a heat roller 61 and a pressing roller 62. The heat roller 61 and the pressing roller 62 are pressed against each other, thus forming a fixing nip therebetween. A heat lamp 63 is provided along the central axis of the heat roller 61 to heat the heat roller 61.

The toner images on the recording sheet S transported by the fixing device 60 are fixed to the recording sheet S by heat and pressure while the recording sheet S passes through the fixing nip. After the toner images are fixed to the recording sheet S in the fixing device 60, the recording sheet S is ejected into a discharge tray 56, provided in the upper part of the printer, with the side on which the toner images are formed facing down.

Cleaning Device

Figure 2:
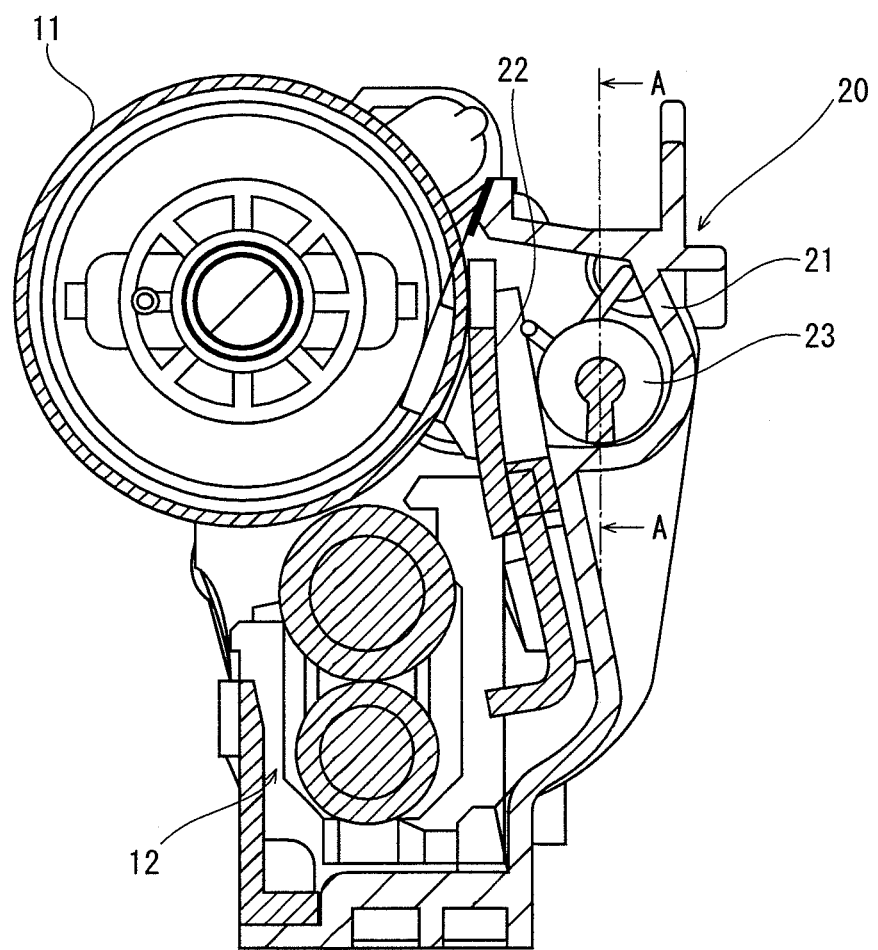
FIG. 2 is a cross-section diagram of a cleaning device provided in the tandem-type color printer of FIG. 1.

FIG. 2 is a cross-section diagram of the cleaning device 20. The cleaning device 20 includes a cleaning blade 22 and a toner transport screw 23. The cleaning blade 22 scrapes residual toner off the surface of the photoconductor drum 11. The toner transport screw 23 transports toner scraped off by the cleaning blade 22.

The cleaning blade 22 is a narrow plate extending along the axial direction of the photoconductor drum 11. One edge of the cleaning blade 22 in the direction of length thereof is positioned higher than the other edge, and the cleaning blade 22 is in contact with the photoconductor drum 11 across the length of the outer circumferential surface thereof. The cleaning blade 22 therefore slides against the surface of the rotating photoconductor drum 11 to scrape off the residual toner on the surface of the photoconductor drum 11.

The toner transport screw 23 is provided within the housing 21 at the opposite side of the cleaning blade 22 than the photoconductor drum 11 and is provided along the axial direction of the photoconductor drum 11. The toner transport screw 23 is provided rotatably within the housing 21 and, by rotating in a predetermined direction, transports the toner scraped off by the cleaning blade 22 from the front of the printer to the back along the axial direction of the photoconductor drum 11.

Figure 3:
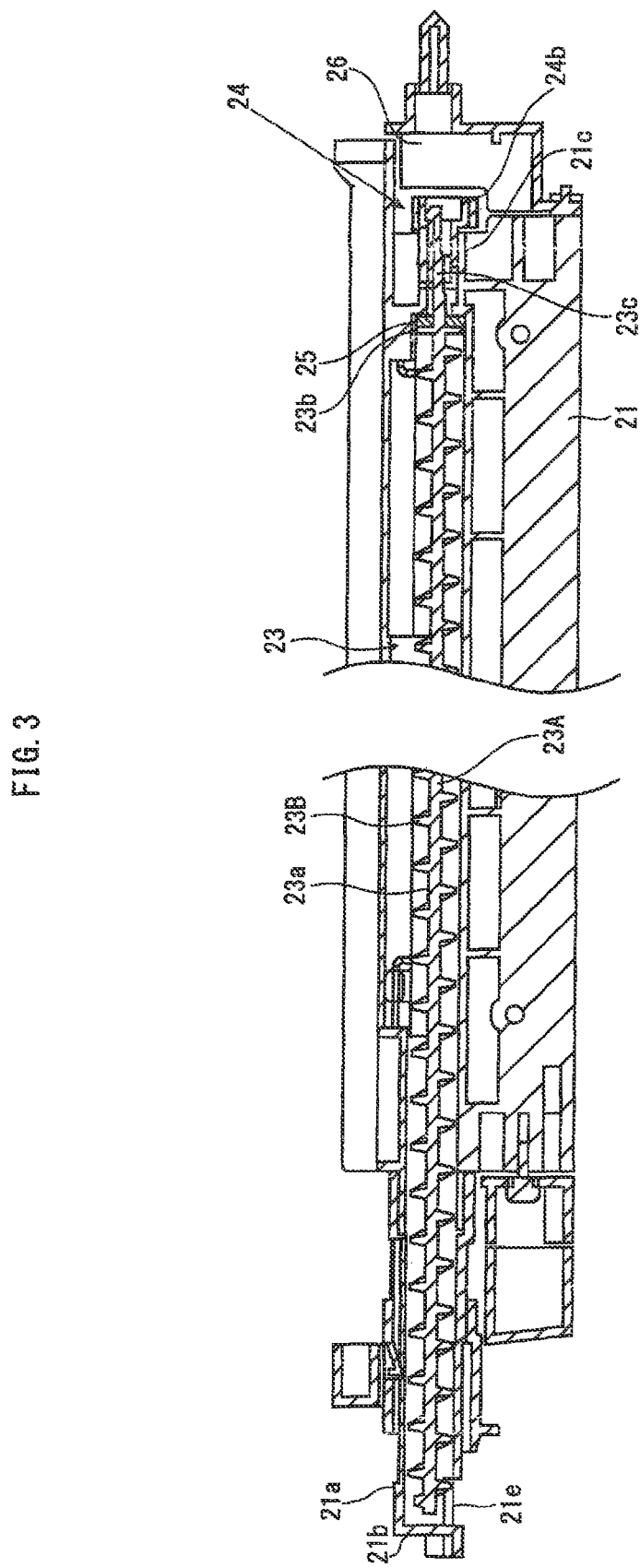
FIG. 3 is a cross-section diagram along the line A-A in FIG. 2.
Figure 4:
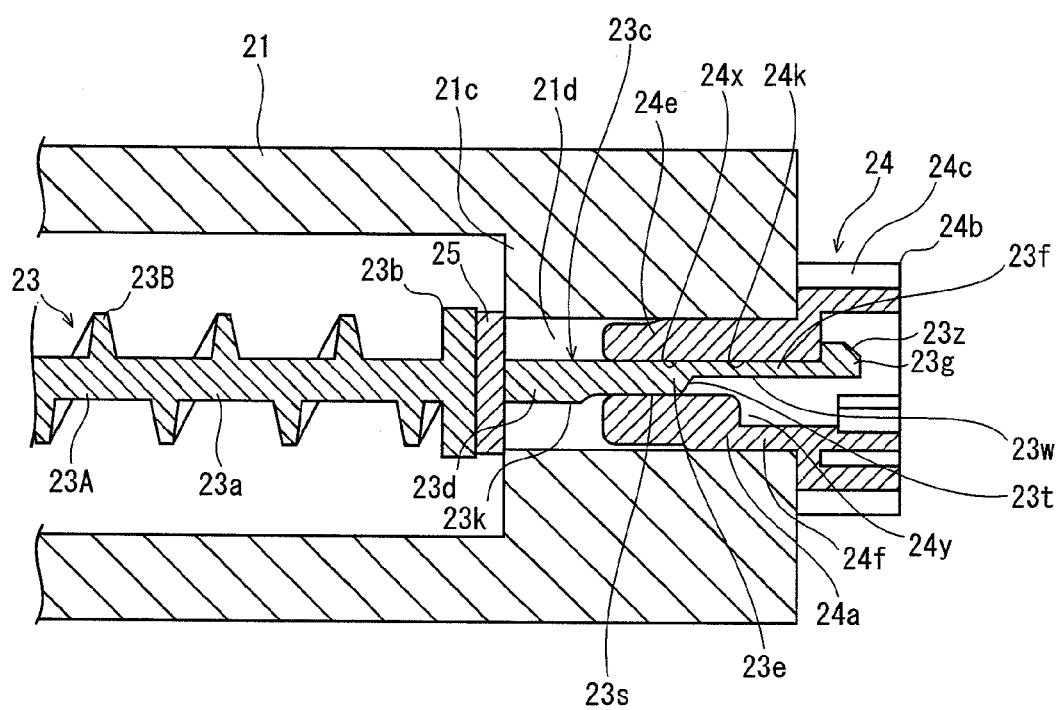
FIG. 4 is a cross-section diagram schematically illustrating the front portion of a toner transport screw in order to illustrate the structure of the front portion.

FIG. 3 is a cross-section diagram of the line A-A in FIG. 2. FIG. 4 is a cross-section diagram schematically illustrating an expanded view of the front portion of the toner transport screw 23 in order to illustrate the structure of the front portion.

As illustrated in FIGS. 3 and 4, the toner transport screw 23 includes a rotating shaft 23A provided along the axial direction of the photoconductor drum 11 and a transport blade 23B provided in the entire toner transport screw 23 except for the front end of the rotating shaft 23A.

Except for the front end, where the transport blade 23B is not provided, the rotating shaft 23A includes a shaft body 23a, a cross-section of which is a circle of a predetermined diameter (approximately 3 mm). The transport blade 23B is provided along the entire shaft body 23a, in the axial direction thereof. The transport blade 23B spirals along the entire length of the shaft body 23a at a predetermined pitch and with a predetermined outer diameter.

The rotating shaft 23A is provided with a flange 23b by the front of the shaft body 23a along which the transport blade 23B is provided. The portion of the rotating shaft 23A closer to the front than the flange 23b is a gear mounting portion 23c in which a gear 24 for transmitting a rotary force to the rotating shaft 23A is mounted. The rotating shaft 23A and the transport blade 23B are formed integrally from synthetic resin.

As illustrated in FIG. 4, the gear mounting portion 23c of the toner transport screw 23 is attached to a side panel (support member) 21c at the front of the housing 21 and traverses a through-hole 21d provided horizontally for supporting the gear 24. The gear 24 mounted on the gear mounting portion 23c includes a hollow shaft 24a engaged with the gear mounting portion 23c and a gear portion 24b provided at the front end of the hollow shaft 24a. The hollow shaft 24a and the gear portion 24b are formed integrally from synthetic resin.

The hollow shaft 24a is attached rotatably to the gear mounting portion 23c, so as to be integral with the gear mounting portion 23c, and is then inserted from the outside of the housing 21 into the through-hole 21d provided in the side panel 21c of the housing 21. The hollow shaft 24a of the gear 24 is supported rotatably within the through-hole 21d, and therefore the side panel 21c in which the through-hole 21d is provided acts as a bearing for the hollow shaft 24a in the gear 24.

The gear portion 24b is a cylinder with a larger major diameter than the hollow shaft 24a. The gear portion 24b is provided coaxially with the hollow shaft 24a at the outer periphery of one end of the hollow shaft 24a. The hollow shaft 24a is provided with an axial hole 24k along the central axis. The front edge face of the axial hole 24k is located within the gear portion 24b. Along the outer periphery of the gear portion 24b, a plurality of teeth 24c are provided in the circumferential direction at a predetermined pitch. The gear portion 24b is positioned on the outside of the front side panel 21c of the housing 21.

The front end of the gear mounting portion 23c in the toner transport screw 23 is engaged with the periphery of the front end of the axial hole 24k located in the gear portion 24b. As a result, the gear 24 is prevented from coming free from the gear mounting portion 23c while being supported rotatably within the through-hole 21d. In other words, in this position, the gear 24 that rotates integrally with the gear mounting portion 23c is retained while being rotatable within the through-hole 21d in the side panel 21c of the housing 21. Details on the structure of the gear 24 and the gear mounting portion 23c are provided below.

Upon transmission of rotary force to the gear portion 24b of the gear 24, rotation of the gear 24 is transmitted to the rotating shaft 23A via the gear mounting portion 23c of the toner transport screw 23. The rotating shaft 23A therefore rotates, and the transport blade 23B rotates integrally with the rotating shaft 23A. As a result, toner that is scraped off the surface of the photoconductor drum 11 by the cleaning blade 22 is transported by the transport blade 23B within the housing 21 from the front to the back.

Note that as illustrated in FIG. 3, the gear portion 24b of the gear 24 is covered by a cover 26 attached to the front side panel 21c of the housing 21. The cover 26 is provided at a predetermined gap from the gear 24 so that if the gear 24 that is supported within the through-hole 21d in the side panel 21c of the housing 21 (see FIG. 4) is disengaged from the gear mounting portion 23c, the gear 24 will not come completely free from the through-hole 21d.

Accordingly, even if the gear 24 becomes disengaged from the gear mounting portion 23c, the range over which the gear 24 can be displaced towards the front within the through-hole 21d in the side panel of the housing 21 is restricted by the cover 26, so that the gear 24 will not come completely free from the through-hole 21d and the hollow shaft 24a of the gear 24 will continue to be supported rotatably within the through-hole 21d. Note that in this case, a rotary force can be transmitted to the gear 24. Accordingly, even in this state, the gear 24 can rotate due to the transmission of rotary force.

As illustrated in FIG. 3, a cylindrical toner discharge portion 21a is provided at the back of the housing 21, horizontally projecting towards the back. An edge face 21b at the back of the toner discharge portion 21a (downstream in the toner transport direction) is closed off.

The toner discharge portion 21a stores the rotating shaft 23A and the transport blade 23B at the back end of the toner transport screw 23. With the toner transport screw 23 mounted onto the front side panel 21c of the housing 21, an appropriate gap is provided between the back end of the rotating shaft 23A and the edge face 21b at the back of the toner discharge portion 21a.

A toner discharge port 21e is provided at the bottom of the back of the toner discharge portion 21a, along the circumference thereof, to allow toner transported into the toner discharge portion 21a to discharge downwards. The edges of the rotating shaft 23A and the transport blade 23B stored in the toner discharge portion 21a are opposite one other in the toner discharge port 21e.

Below the toner discharge port 21e, a toner receptacle (not shown in the figures) is provided to store toner discharge through the toner discharge port 21e. The back end of the transport blade 23B within the toner transport screw 23 is stored in the toner discharge portion 21a and faces the toner discharge port 21e. Toner that is transported by the transport blade 23B is discharged downwards by passing through the toner discharge port 21e to be collected in the toner receptacle.

The gear mounting portion 23c at the front end of the rotating shaft 23A within the toner transport screw 23 is mounted onto the side panel 21c, and in this state, a predetermined gap is provided between the back end of the rotating shaft 23A and the edge face 21b at the back of the toner discharge portion 21a. Therefore, if the gear mounting portion 23c and the gear 24 become disengaged, the rotating shaft 23A can move along the axial direction in a range corresponding to the gap between the rotating shaft 23A and the edge face 21b of the toner discharge portion 21a.

Figure 5:
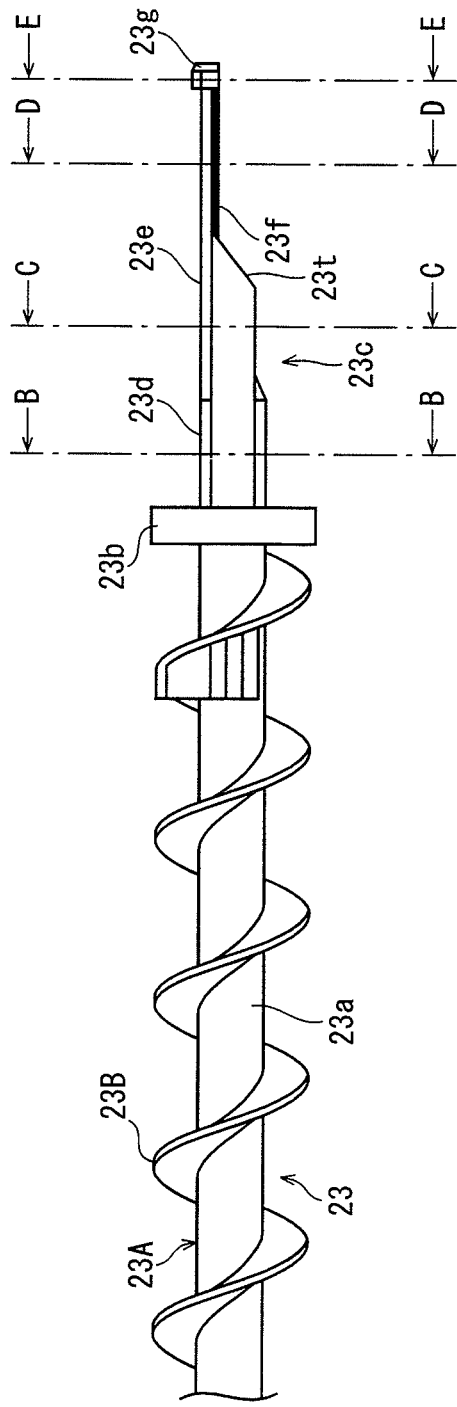
FIG. 5 is a lateral view illustrating the front portion of the toner transport screw, with the toner transport screw removed from the cleaning device and the gear removed.

FIG. 5 is a lateral view illustrating the gear mounting portion 23c in the rotating shaft 23A within the toner transport screw 23, and an area surrounding the gear mounting portion 23c. In FIG. 5, the toner transport screw 23 has been removed from the cleaning device 20, and the gear 24 has been removed. FIGS. 6, 7, 8, and 9 are cross-section diagrams respectively along lines B-B, C-C, D-D, and E-E in FIG. 5.

As illustrated in FIG. 5, the flange 23b is shaped as a disc having a larger diameter than the shaft body 23a and is coaxial with the shaft body 23a.

As also illustrated in FIG. 5, the gear mounting portion 23c, which is provided further towards the front of the rotating shaft 23A than the flange 23b, is provided with a base portion 23d adjacent to the front of the flange 23b, a shaft portion 23e adjacent to the front of the base portion 23d, a flexible portion 23f adjacent to the front of the shaft portion 23e, and a retaining portion 23g provided at the front tip of the flexible portion 23f.

As illustrated in FIG. 4, the base portion 23d and the shaft portion 23e of the gear mounting portion 23c are located within the through-hole 21d provided in the side panel 21c of the housing 21. Furthermore, the section of the flexible portion 23f near the shaft portion 23e is located inside the through-hole 21*d*, whereas the retaining portion 23*g* that is continuous with the flexible portion 23*f* extends outside of the through-hole 21*d*.

The shaft portion 23*e* of the gear mounting portion 23*c* is approximately 10 mm long in the axial direction. The base portion 23*d* is slightly shorter in the axial direction than the shaft portion 23*e*. The length in the axial direction from the shaft portion 23*e* to the tip of the retaining portion 23*g* is approximately 12 mm, which is slightly longer than the length of the shaft portion 23*e* in the axial direction.

As illustrated in FIG. 4, the base portion 23*d* of the gear mounting portion 23*c* is engaged with a ring-shaped seal member 25 between the flange 23*b* and the front side panel 21*c* of the housing 21. The seal member 25 is formed from an elastic material, such as a sponge, and has a larger outer diameter than the inner diameter of the through-hole 21*d* provided in the side panel 21*c* of the housing 21. The seal member 25 is pressed against the outer circumferential surface of the base portion 23*d*.

The seal member 25 is compressed between the flange 23*b* and the front side panel 21*c* of the housing 21, so as to be pressed against the area of the side plate 21*c* surrounding the through-hole 21*d* in the housing 21. As a result, the seal member 25 seals the edge face of the through-hole 21*d* so that toner inside the housing 21 will not leak outside through the through-hole 21*d*.

As described above, with the hollow shaft 24*a* being supported by the through-hole 21*d*, the gear 24 is prevented by the retaining portion 23*g* from coming free from the gear mounting portion 23*c*.

With the gear 24 being retained by the retaining portion 23*g*, the flange 23*b* compresses the seal member 25 engaged with the base portion 23*d* of the gear mounting portion 23*c* by pushing the seal member 25 from within the housing 21 against the side panel 21*c*. Accordingly, the reaction force of the compressed seal member 25 acts on both the flange 23*b* and the retaining portion 23*g* of the rotating shaft 23A so as to push the flange 23*b* and the retaining portion 23*g* apart from each other.

As a result of the action of this force, the retaining portion 23*g* engaged with the gear 24 pushes the gear portion 24*b* against the side panel 21*c* from within the housing 21. The retaining portion 23*g* therefore continues to be engaged with the hollow shaft 24*a* of the gear 24, thus preventing the hollow shaft 24*a* of the gear 24 from coming free from the through-hole 21*d*.

Figure 6:
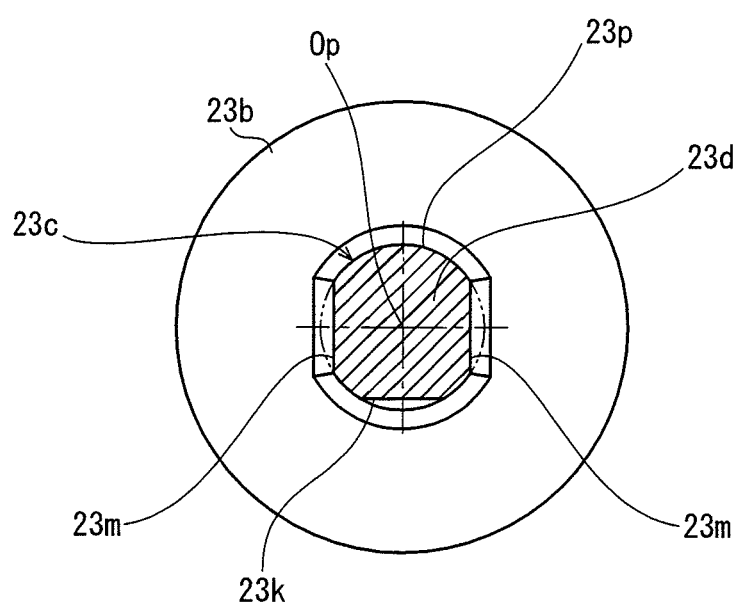
FIG. 6 is a cross-section diagram along the line B-B in FIG. 5.

As illustrated in FIG. 6, the base portion 23*d* provided in the gear mounting portion 23*c* of the rotating shaft 23A is a shaft provided coaxially with the central axis Op of the rotating shaft 23A (the central rotational axis). A cross-section of the base portion 23*d* shows a cylinder with a diameter slightly larger than the shaft body 23*a* (4 mm) notched by a pair of flat base portion side faces 23*m* and a flat base portion bottom face 23*k*. The base portion side faces 23*m* extend in parallel in the axial direction on either side of the central rotational axis Op. The base portion bottom face 23*k* extends in the axial direction in a state perpendicular to the base portion side faces 23*m*.

The base portion side faces 23*m* are each separated from the central rotational axis Op of the base portion 23*d* by an equal distance. The base portion bottom face 23*k* is separated from the central rotational axis Op by approximately the same distance as the distance between the central rotational axis Op and the base portion side faces 23*m*. Accordingly, between the base portion bottom face 23*k* and each of the base portion side faces 23*m*, an outer circumferential surface is provided with the central rotational axis Op at the center and having a constant radius.

At the opposite side of the central rotational axis Op from the base portion bottom face 23*k*, a base portion outer circumferential surface 23*p* is provided with the central rotational axis Op at the center and having a constant radius (2 mm). The base portion outer circumferential surface 23*p* is formed between the base portion side faces 23*m* and is located opposite the base portion bottom face 23*k* with the central rotational axis Op therebetween.

Figure 7:
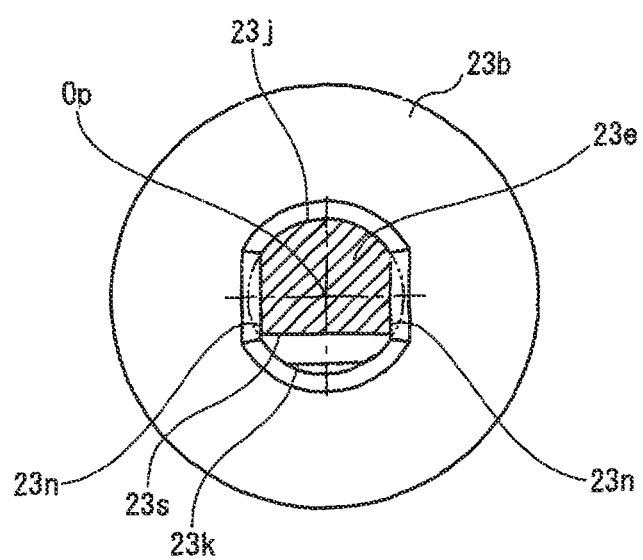
FIG. 7 is a cross-section diagram along the line C-C in FIG. 5.

As illustrated in FIG. 7, the shaft portion 23*e* provided adjacent to the front of the base portion 23*d* is a shaft provided coaxially with the central rotational axis Op of the base portion 23*d*. At a position nearer the central rotational axis Op than the base portion bottom face 23*k*, the base portion 23*d* is notched by a first flat face 23*s* parallel to the base portion bottom face 23*k* so that the shaft portion 23*e* has a D-shaped cross-section.

Accordingly, the shaft portion 23*e* is also provided with first side faces 23*n* on either side of the central rotational axis Op that are positioned along the same face as the base portion side faces 23*m* provided in the base portion 23*d*. The first side faces 23*n* form right angles with the first flat face 23*s* and are shorter than the base portion side faces 23*m* in a direction of width orthogonal to the axial direction.

At the opposite side of the central rotational axis Op from the first flat face 23*s*, a first outer circumferential surface 23*j* is continuous with the base portion outer circumferential surface 23*p* and is located opposite the first flat face 23*s* with the central rotational axis Op therebetween. The distance from the central rotational axis Op to the first flat face 23*s* is shorter than the radius of the outer circumferential surface 23*p*.

Figure 8:
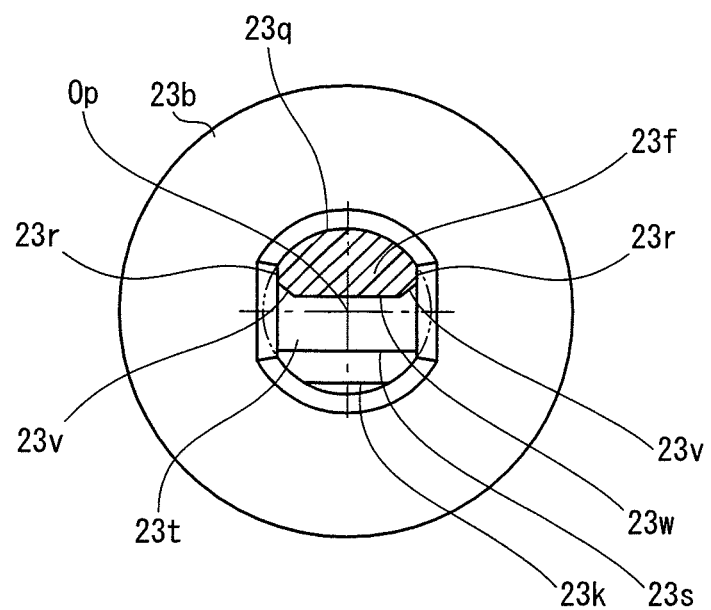
FIG. 8 is a cross-section diagram along the line D-D in FIG. 5.

As illustrated in FIG. 8, at a position on the opposite side of the central rotational axis Op than the first flat face 23*s*, the shaft portion 23*e* is notched by a second flat face 23*w* parallel to the first flat face 23*s* so that the flexible portion 23*f* adjacent to the front of the shaft portion 23*e* has a D-shaped cross section (having a smaller cross-sectional area than the shaft portion 23*e*).

The flexible portion 23*f* is also provided with second side faces 23*r* on either side of the central rotational axis Op that are positioned along the same face as the first side faces 23*n* provided in the shaft portion 23*e*. The second side faces 23*r* are shorter than the first side faces 23*n* in a direction orthogonal to the axial direction (in the direction of width).

The section within the flexible portion 23*f* opposite the second flat face 23*w* is a second outer circumferential surface 23*q* continuous with the first outer circumferential surface 23*j* of the shaft portion 23*e*. The second outer circumferential surface 23*q* is provided between the second side faces 23*r* located on either side. Flat faces 23*v* are provided between either end, in the direction of width, of the second flat face 23*w* and each of the second side faces 23*r*. The flat faces 23*v* are formed by chamfering.

Due to the second flat face 23*w* being closer to the second outer circumferential surface 23*q* than the central rotational axis Op is, the thickness of the flexible portion 23*f* in a direction perpendicular to the second flat face 23*w* is less, along the entire length of the flexible portion 23*f*, than the thickness of the shaft portion 23*e* in the same direction. Furthermore, the cross-sectional area of the flexible portion 23*f* is smaller than the cross-sectional area of the shaft portion 23*e*. As a result, the cross-sectional second moment of area of the flexible portion 23*f* is smaller than that of the shaft portion 23*e*.

Note that as illustrated in FIG. 5, a guide face 23t is provided between the second flat face 23w of the flexible portion 23f and the first flat face 23s of the shaft portion 23e. The guide face 23t is inclined so that the distance, in the radial direction, from the second outer circumferential surface 23q increases as the guide face 23t approaches the first flat face 23s in the axial direction. The guide face 23t is continuous with both the second flat face 23w and the first flat face 23s.

Figure 9:
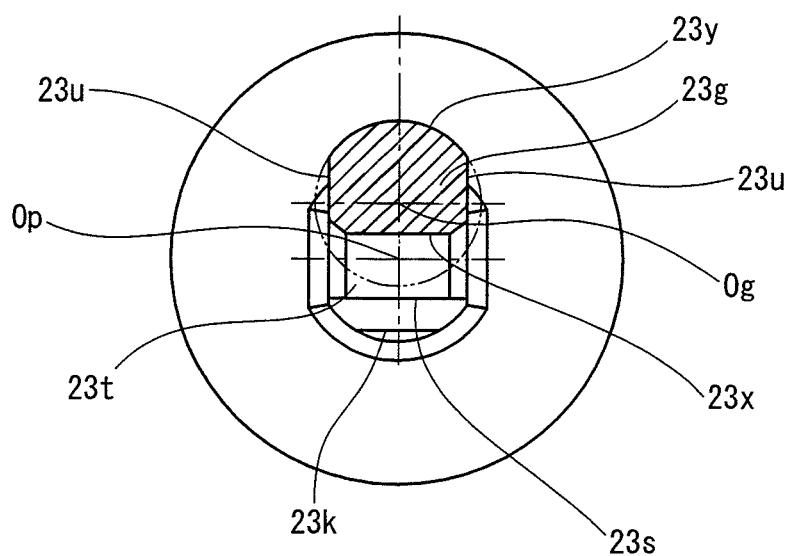
FIG. 9 is a cross-section diagram along the line E-E in FIG. 5.

As illustrated in FIG. 9, the retaining portion 23g provided at the front tip of the flexible portion 23f is a shaft whose shape nearly matches a cross-sectional of the shaft portion 23e. The retaining portion 23g, however, is shifted with respect to the shaft portion 23e in the radial direction towards the second outer circumferential surface 23q of the flexible portion 23f. As a result, the central axis Og of the retaining portion 23g is eccentric with respect to the central rotational axis Op, being displaced in the radial direction towards the second outer circumferential surface 23q of the flexible portion 23f.

The retaining portion 23g includes a third flat face 23x corresponding to the first flat face 23s of the shaft portion 23e, a third outer circumferential surface 23y corresponding to the first outer circumferential surface 23j of the shaft portion 23e, and third side faces 23u corresponding respectively to the first side faces 23n of the shaft portion 23e. The third flat face 23x is positioned along the same plane as the second flat face 23w of the flexible portion 23f.

Note that, as illustrated in FIG. 4, the front end (tip) of the third outer circumferential surface 23y of the retaining portion 23g includes a tip guide face 23z that is inclined to approach the central rotational axis Op closer to the front of the retaining portion 23g.

As illustrated in FIG. 4, the hollow shaft 24a of the gear 24 includes a connecting portion 24e and a tubular portion 24f. In the connecting portion 24e, a first hole portion 24x is provided, with which the shaft portion 23e of the gear mounting portion 23c engages. In the tubular portion 24f, a second hole portion 24y is provided to house the flexible portion 23f extending from the front of the shaft portion 23e. The tubular portion 24f is provided adjacent to the front of the connecting portion 24e. Together, the first hole portion 24x and the second hole portion 24y form the axial hole 24k of the hollow shaft 24a.

Figure 10:
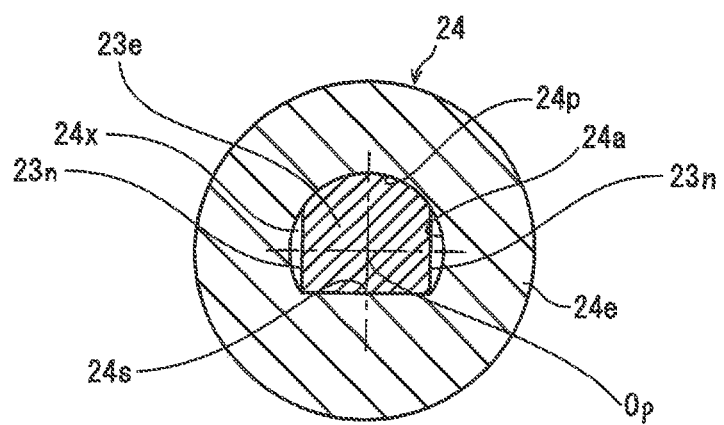
FIG. 10 is a cross-section diagram illustrating a hollow shaft of the gear engaged with a shaft portion of a gear mounting portion.

FIG. 10 is a cross-section diagram illustrating the hollow shaft 24a of the gear 24 engaged with the shaft portion 23e of the gear mounting portion 23c. As illustrated in FIG. 10, a cross-section of the first hole portion 24x in the connecting portion 24e of the hollow shaft 24a of the gear 24 is a non-circular D-shape. Accordingly, the first hole portion 24x of the connecting portion 24e is surrounded by an inner circumferential surface 24p, facing and having the same curvature as the outer circumferential surface 23j of the shaft portion 23e, and a flat opposing face 24s parallel to the first flat face 23s of the shaft portion 23e and located opposite the inner circumferential surface 24p with the central axis therebetween.

The second hole portion 24y of the tubular portion 24f adjacent to the front of the hollow shaft 24a has an inner circumferential surface that, along the entire circumference thereof, has a radius equivalent to the radius of the inner circumferential surface 24p of the connecting portion 24e. Accordingly, the second hole portion 24y of the tubular portion 24f expands further outwards than the opposing face 24s in the first hole portion 24x of the connecting portion 24e.

As illustrated in FIG. 4, the outer diameter of the hollow shaft 24a in the gear 24 is approximately equal to the inner diameter of the through-hole 21d, except for at the tip of the hollow shaft 24a opposite the gear portion 24b. At the tip opposite the gear portion 24b, the outer diameter of the hollow shaft 24a is slightly smaller than the inner diameter of the through-hole 21d. Except for at the tip opposite the gear portion 24b, the hollow shaft 24a in the gear 24 is engaged with the through-hole 21d provided in the side panel 21c of the housing 21 so as to be slidable along the inner circumferential surface of the through-hole 21d in the axial direction and in the circumferential direction.

Therefore, the outer circumferential surface of the hollow shaft 24a in the gear 24 is slidably supported within the through-hole 21d. The portion of the hollow shaft 24a that is slidably supported within the through-hole 21d overlaps, in a direction orthogonal to the axial direction, the portion of the opposing face 24s in the first hole portion 24x of the hollow shaft 24a that opposes the first flat face 23s of the shaft portion 23e engaged within the hollow shaft 24a.

With this structure, along the hollow shaft 24a of the gear 24 that rotates in the through-hole 21d, power is transmitted from the connecting portion 24e of the gear 24 to the shaft portion 23e at the portion of the hollow shaft 24a that is stably supported within the through-hole 21d. Therefore, even if the shaft portion 23e of the rotating shaft 23A vibrates, vibration of the connecting portion 24e of the gear 24 within the through-hole 21d is controlled, so that rotation of the gear 24 is stably transmitted to the rotating shaft 23A.

Since the second moment of area of the shaft portion 23e that is engaged with the connecting portion 24e of the gear 24 is larger than that of the flexible portion 23f, the shaft portion 23e is more rigid than the flexible portion 23f. As a result, when a force is applied to the shaft portion 23e in the radial direction from the connecting portion 24e, the shaft portion 23e is prevented from bending. By contrast, the second moment of area of the flexible portion 23f is smaller than that of the shaft portion 23e, and the flexible portion 23f is longer in the axial direction than the shaft portion 23e. Therefore, only the flexible portion 23f bends, without the rigid shaft portion 23e bending.

The length, in the axial direction, of the connecting portion 24e within the hollow shaft 24a slidably engaged with the through-hole 21d is greater than the range of displacement, in the axial direction, of the gear 24 as regulated by the cover 26 attached to the side panel 21c of the housing 21. Furthermore, the length in the axial direction of the portion of the opposing face 24s in the hollow shaft 24a (see FIG. 10) that opposes the first flat face 23s of the shaft portion 23e engaged within the hollow shaft 24a is greater than the range of displacement, in the axial direction, of the gear 24 as regulated by the cover 26 attached to the side panel 21c of the housing 21.

As a result, even if the gear portion 24b of the gear 24 moves in a direction away from the side panel 21c of the housing 21, the connecting portion 24e of the hollow shaft 24a continues to be engaged with the shaft portion 23e of the gear mounting portion 23c. Accordingly, the opposition between the opposing face 24s of the hollow shaft 24a and the first flat face 23s of the shaft portion 23e engaged within the hollow shaft 24a is maintained, and rotation of the gear 24 is transmitted to the rotating shaft 23A.

The length, in the axial direction, of the connecting portion 24e in the hollow shaft 24a is greater than the gap between the back end of the toner transport screw 23 and the edge face 21b at the back of the toner discharge portion 21a. Accordingly, even if the gear 24 supported by the side panel 21c of the housing 21 becomes disengaged from the retaining portion 23g of the gear mounting portion 23c in the rotating shaft 23A of the toner transport screw 23, the rotating shaft 23A can only move towards the back within a range equal to the gap between the back end of the toner transport screw 23 and the edge face 21b at the back of the toner discharge portion 21a.

As a result, even if the gear 24 becomes disengaged from the retaining portion 23g, as long as the gear portion 24b of the gear 24 is supported within the through-hole 21d in the side panel 21c of the housing 21, the connecting portion 24e of the hollow shaft 24a and the shaft portion 23e of the gear mounting portion 23c will not become disengaged. Therefore, the opposition between the opposing face 24s of the hollow shaft 24a and the first flat face 23s of the shaft portion 23e engaged within the hollow shaft 24a is maintained, and rotation of the gear 24 is transmitted to the rotating shaft 23A.

Steps for mounting the gear 24 onto the gear mounting portion 23c in the rotating shaft 23A of the toner transport screw 23 in the cleaning device 20 with the above structure are now described with reference to FIGS. 11A through 11D.

First, the seal member 25 is engaged with the base portion 23d of the gear mounting portion 23c in the rotating shaft 23A of the toner transport screw 23. The seal member 25 is disposed so as to be in contact with the flange 23b.

Figure 11A:
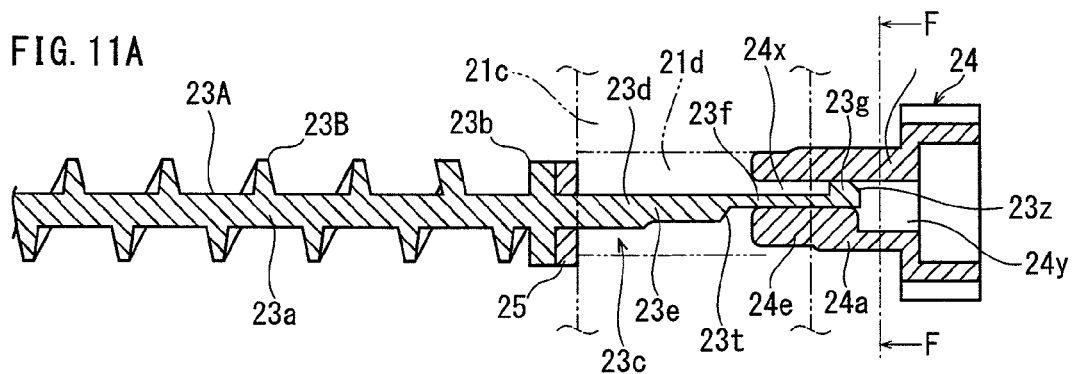
FIGS. 11A through 11D are cross-sectional diagrams illustrating steps for mounting the gear onto a rotating shaft of the toner transport screw.

At this point, the retaining portion 23g at the tip of the gear mounting portion 23c, provided at the front of the toner transport screw 23, is inserted within the through-hole 21d in the front side plate 21c of the housing 21, as shown in FIG. 11A. The retaining portion 23g passes through the through-hole 21d to protrude out of the side panel 21c of the housing 21.

The seal member 25 is thus sandwiched between the side panel 21c of the housing 21 and the flange 23b.

Next, the tip of the first hole portion 24x, which is located at the back of the connecting portion 24e in the hollow shaft 24a of the gear 24 (the opposite end from the gear portion 24b), is engaged with the retaining portion 23g in the gear mounting portion 23c.

The retaining portion 23g has the same cross-sectional shape as the first hole portion 24x of the connecting portion 24e in the hollow shaft 24a. However, since the tip guide face 23z, which is inclined to approach the central rotational axis Op, is provided at the front tip of the third outer circumferential surface 23y of the retaining portion 23g, the tip guide face 23z guides the retaining portion 23g smoothly into the first hole portion 24x of the connecting portion 24e.

Figure 12:
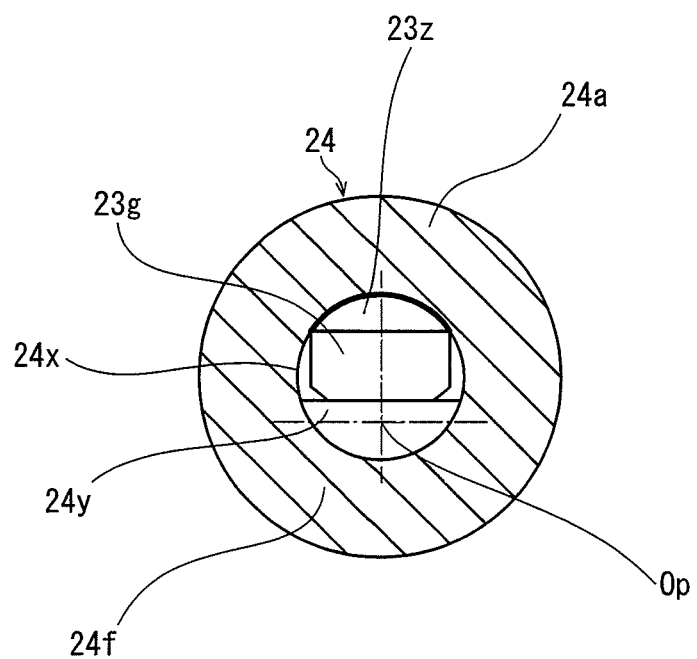
FIG. 12 is a cross-section diagram along the line F-F in FIG. 11A.

FIG. 12 is a cross-section diagram along the line F-F in FIG. 11A. As illustrated in FIG. 12, the first hole portion 24x of the connecting portion 24e in the hollow shaft 24a of the gear 24 has nearly the same cross-sectional D-shape as the cross-section of the retaining portion 23g. The retaining portion 23g is coaxial with the first hole portion 24x of the connecting portion 24e.

Figure 11B:
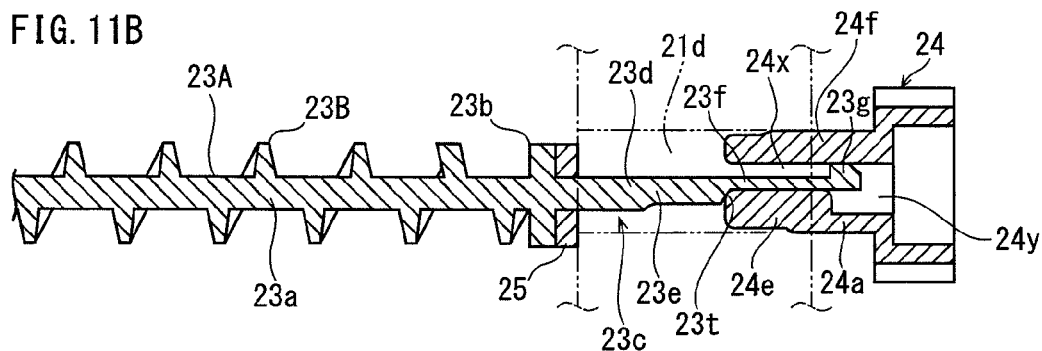
Figure 11C:
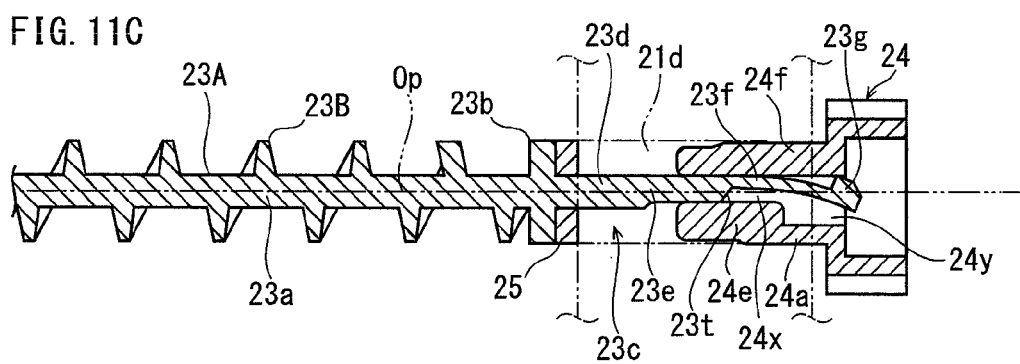

At this point, as illustrated in FIG. 11B, the back end of the hollow shaft 24a of the gear 24, whose outer circumferential surface has a smaller radius, is inserted into the through-hole 21d provided in the side panel 21c of the housing 21. As a result, the retaining portion 23g is displaced from the first hole portion 24x of the connecting portion 24e to the second hole portion 24y of the tubular portion 24f.

The guide face 23t of the gear mounting portion 23c (provided between the second flat face 23w of the flexible portion 23f and the first flat face 23s of the shaft portion 23e) then comes into contact with the back edge of the opposing face 24s provided in the connecting portion 24e of the hollow shaft 24a.

Next, as the hollow shaft 24a of the gear 24 is further inserted into the through-hole 21d, the portion of the hollow shaft 24a whose outer circumferential surface has a larger radius, and which is continuous with the portion having a smaller radius, is inserted into the through-hole 21d. As a result, the hollow shaft 24a and the through-hole 21d become coaxial. At this point, the retaining portion 23g provided at the front end of the gear mounting portion 23c is in contact with the upper portion of the inner circumferential surface along the second hole portion 24y of the tubular portion 24f.

Subsequently, upon displacing the hollow shaft 24a of the gear 24 towards the back within the through-hole 21d provided in the side panel 21c of the housing 21, the guide face 23t is guided into the first hole portion 24x of the connecting portion 24e. The shaft portion 23e thus gradually enters into the first hole portion 24x, which has a D-shaped cross-section, of the connecting portion 24e.

At this point, since the second side faces 23r and the first side faces 23n are formed in the same plane on either side of the central rotational axis Op respectively in the flexible portion 23f and the shaft portion 23e, the shaft portion 23e can be engaged within the first hole portion 24x of the connecting portion 24e by displacement in the radial direction along the guide face 23t. Accordingly, the shaft portion 23e, which has a non-circular cross-section, can be engaged smoothly within the first hole portion 24x of the connecting portion 24e, which also has a non-circular cross-section.

Note that if the flexible portion 23f and the shaft portion 23e are not provided respectively with the second side faces 23r nor with the first side faces 23n, but rather have approximately the same D-shaped cross-section as the first hole portion 24x of the connecting portion 24e, then the shaft portion 23e cannot be engaged within the first hole portion 24x while being displaced in the radial direction, thus making it impossible to engage the shaft portion 23e with the first hole portion 24x of the connecting portion 24e unless the two portions are in a coaxial state. It would thus be impossible to achieve a structure that engages the shaft portion 23e within the first hole portion 24x of the connecting portion 24e while guiding the shaft portion 23e in the radial direction along the guide face 23t.

With the above steps, once the central axis of the shaft portion 23e of the gear mounting portion 23c becomes coaxial with the central axis of the hollow shaft 24a, the shaft portion 23e also becomes coaxial with the through-hole 21d, which is coaxial with the hollow shaft 24a. Accordingly, the retaining portion 23g, which was eccentric with respect to the shaft portion 23e of the gear mounting portion 23c, is pressed firmly against the inner circumferential surface of the tubular portion 24f in the hollow shaft 24a. As a result, since the tip of the flexible portion 23f is forced downwards, the flexible portion 23f bends, becoming convex.

In this state, upon displacing the hollow shaft 24a further back within the through-hole 21d, the first hole portion 24x of the connecting portion 24e does not rotate with respect to the first hole portion 24x, since the shaft portion 23e, whose cross-sectional shape is non-circular, is coaxially engaged with the first hole portion 24x of the connecting portion 24e, whose cross-sectional shape is also non-circular. The hollow shaft 24a thus progresses smoothly in the axial direction within the first hole portion 24x. In this case, the retaining portion 23g remains pressed against the inner circumferential surface of the second hole portion 24y in the tubular portion 24f.

As the retaining portion 23g is displaced towards the front, the length of the flexible portion 23f that has entered into the second hole portion 24y of the tubular portion 24f gradually increases. As a result, the force acting on the retaining portion 23g from the inner circumferential surface of the second hole portion 24y gradually increases, and the amount of bending of the flexible portion 23f, which is a cantilever supported by the shaft portion 23e, gradually increases. Note that the flexible portion 23f remains bent while the retaining portion 23g passes through the second hole portion 24y.

Figure 11D:
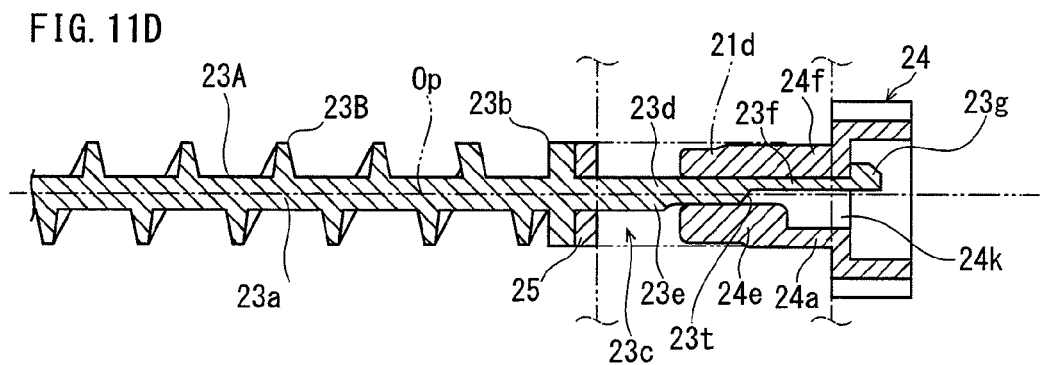

Subsequently, by passing through the second hole portion 24y, the retaining portion 23g of the gear mounting portion 23c passes through the axial hole 24k in the gear portion 24b of the gear 24 and extends beyond the edge of the axial hole 24k. As a result, the third outer circumferential surface 23y is no longer pushed against by the inner circumferential surface of the second hole portion 24y in the tubular portion 24f, and the flexible portion 23f stops bending. As shown in FIG. 11D, the retaining portion 23g therefore becomes engaged with the edge of the axial hole 24k in the gear 24.

With the retaining portion 23g engaged with the gear 24, the gear portion 24b of the gear 24 is pressed against the front side plate 21c of the housing 21, and the flange 23b provided on the rotating shaft 23A is pulled towards the side plate 21c of the housing 21. As a result, the seal member 25 is compressed between the flange 23b and the side place 21c of the housing 21. The seal member 25 thus seals the end face, within the housing 21, of the through-hole 21d provided in the side panel 21c.

Furthermore, the hollow shaft 24a of the gear 24, with which the retaining portion 23g is engaged, is inserted within the through-hole 21d provided in the side plate 21c and is rotatably supported by the through-hole 21d. In this case, since the first hole portion 24x, which has a D-shaped cross-section, of the connecting portion 24e is engaged in alignment with the shaft portion 23e, which has an approximately D-shaped cross-section, of the gear mounting portion 23c, the hollow shaft 24a of the gear 24 and the shaft portion 23e can rotate integrally.

As a result, when rotation is transmitted to the gear portion 24b of the gear 24 so that the gear portion 24b rotates, the hollow shaft 24a of the gear 24, which is rotatably supported by the side panel 21c of the housing 21, rotates integrally. This causes the shaft portion 23e in the rotating shaft 23A of the toner transport screw 23, which is connected integrally with the hollow shaft 24a, to also rotate integrally, so that the entire rotating shaft 23A rotates.

In this way, when the rotating shaft 23A of the toner transport screw 23 rotates, the transport blade 23B of the toner transport screw 23 rotates integrally with the rotating shaft 23A. As a result, toner within the housing 21 is transported from the front to the back, is discharged downwards by passing through the toner discharge port 21e provided in the toner discharge portion 21a, and is collected in the toner receptacle provided below the toner discharge port 21e.

In the present embodiment, a cross-section of the retaining portion 23g is the same as a cross-section of the shaft portion 23e, except that the cross-section of the retaining portion 23g is shifted outwards in the radial direction with respect to the cross-section of the shaft portion 23e. Accordingly, the third outer circumferential surface 23y of the retaining portion 23g has the same radius as the maximum radius of the first outer circumferential surface 23j in the shaft portion 23e.

With such a cross-section, even if the retaining portion 23g is eccentric with respect to the shaft portion 23e, the retaining portion 23g can, by being connected to the flexible portion 23f, pass through the second hole portion 24y of the tubular portion 24f in the hollow shaft 24a in a bent state when the shaft portion 23e is inserted into the first hole portion 24x in the connecting portion 24e of the hollow shaft 24a.

Accordingly, even if the retaining portion 23g is greatly shifted with respect to the shaft portion 23e, the retaining portion 23g passes through the tubular portion 24f due to bending of the flexible portion 23f. Subsequently, upon the flexible portion 23f ceasing to bend, the retaining portion 23g engages with the gear 24. In this case, the third outer circumferential surface 23y of the retaining portion 23g, which is displaced with respect to the shaft portion 23e, protrudes outwards from the shaft portion 23e to a great degree due to having the same maximum radius as the first outer circumferential surface 23j of the shaft portion 23e. As a result, the retaining portion 23g has a large surface of engagement with the gear 24, thus assuring reliable engagement between the retaining portion 23g and the gear 24. This eliminates the risk of the retaining portion 23g and the gear 24 easily becoming disengaged.

Since the retaining portion 23g is formed as a shaft having a similar cross-sectional shape to the shaft portion 23e, the retaining portion 23g has similar rigidity and strength as the shaft portion 23e. As a result, even if a large force is applied from the gear 24 to the retaining portion 23g, there is no risk of the retaining portion 23g breaking. Accordingly, the retaining portion 23g can reliably prevent the gear 24 from coming free from the rotating shaft 23A and the through-hole 21d provided in the side panel 21c of the housing 21.

As described above, the retaining portion 23g of the present embodiment reliably prevents the gear 24 from coming free form the rotating shaft 23A and the through-hole 21d. During transfer of power by the gear 24, however, if the retaining portion 23g and the gear 24 should happen to become disengaged, the gear 24 can move in a direction away from the through-hole 21d.

In this case, there is no risk of the gear 24 coming free from the through-hole 21d due to the cover 26 attached to the side plate 21c of the housing 21. The gear 24 thus remains rotatably supported within the through-hole 21d. Moreover, since the connecting portion 24e of the hollow shaft 24a in the gear 24 remains engaged with the shaft portion 23e, rotation transmitted to the gear portion 24b of the gear 24 is transmitted from the connecting portion 24e of the hollow shaft 24a to the shaft portion 23e of the gear mounting portion 23c. The rotating shaft 23A can therefore be rotated.

If the retaining portion 23g and the gear 24 become disengaged, the rotating shaft 23A can move towards the back. In this case, even if the rotating shaft 23A moves towards the back, the connecting portion 24e of the hollow shaft 24a remains engaged with the shaft portion 23e of the gear mounting portion 23c. Therefore, rotation transmitted to the gear portion 24b of the gear 24 is transmitted to the rotating shaft 23A via the gear mounting portion 23c.

As described above, even if the retaining portion 23g and the gear 24 should happen to become disengaged, then as long as rotation is transmitted to the gear 24, the gear 24 continues to be supported within the through-hole 21d, and rotation of the gear 24 continues to be transmitted to the rotating shaft 23A. Accordingly, within the housing 21, the toner transport screw 23 continues to transport toner.

Modifications

In the present embodiment, the first hole portion 24x of the connecting portion 24e in the hollow shaft 24a of the gear 24 has a D-shaped cross-section surrounded by the inner circumferential surface 24p and the opposing face 24s. Furthermore, the shaft portion 23e of the gear mounting portion 23c also includes the outer circumferential surface 23j and the first flat face 23s. These portions are not, however, limited to the above structures, as long as the cross-sectional shapes allow for transmission of rotary force between the hollow shaft 24a of the gear 24 and the shaft portion 23e of the gear mounting portion 23c. Therefore, the cross-sectional shape of the interior space of the first hole portion 24x of the connecting portion 24e in the hollow shaft 24a and of the shaft portion 23e may be another shape such as an ellipse.

In the above embodiment, the mounting structure is for mounting a gear onto a rotating shaft. The present invention may also be adopted with a different power transmission body such as a pulley.

Furthermore, the mounting structure of the present invention for mounting a power transmission body is not limited to a toner transportation device in a cleaning device, but may also be used in a toner transportation device provided in an image forming apparatus. The mounting structure of the present invention for mounting a power transmission body is not limited to a toner transportation device used in an image forming apparatus either, however, and may be adopted in a different rotating mechanism.

SUMMARY OF EMBODIMENTS

In the power transmission body mounting structure of the present invention, since only one flexible portion is provided between the retaining portion and the shaft portion, the flexible portion can be bent to a great degree while the retaining portion provided at the tip of the flexible portion passes through the hole in the power transmission body. As a result, after passing through the hole in the power transmission body, the retaining portion protrudes outside to a great degree with respect to the shaft portion, thus allowing for a great increase in the area over which the retaining portion and the power transmission body are engaged. Accordingly, the retaining portion reliably prevents the power transmission body from coming free from the rotating shaft.

Preferably, in the power transmission body mounting structure, a guide face is provided between the flexible portion and the shaft portion to guide the shaft portion into the first hole portion.

Preferably, in the power transmission body mounting structure, the first hole portion of the axial hole is surrounded by an inner circumferential surface having a central axis coaxial with the rotating shaft and by a flat opposing face on an opposite side of the central axis than the inner circumferential surface, and the shaft portion includes a first outer circumferential surface facing the inner circumferential surface and a first flat face facing the opposing face.

Preferably, in the power transmission body mounting structure, the retaining portion has a cross-sectional shape matching a cross-sectional shape of the shaft portion.

Preferably, in the power transmission body mounting structure, the flexible portion includes a second flat face, parallel to the first flat face at a location between the first outer circumferential surface and the first flat face of the shaft portion, and a second outer circumferential surface continuous with the first outer circumferential surface, and the guide face is inclined between the second flat face of the flexible portion and the first flat face of the shaft portion so as to gradually become more distant in a radial direction from the second outer circumferential surface as the guide face approaches the first flat face from the second flat face in the axial direction.

Preferably, in the power transmission body mounting structure, along opposite sides of the central axis of the rotating shaft, the shaft portion is provided with first side faces continuous with the first outer circumferential surface and the first flat face, and the flexible portion is provided with second side faces respectively positioned along a same face as the first side faces.

Preferably, in the power transmission body mounting structure, the retaining portion includes a third flat face positioned along a same face as the second flat face in the flexible portion, and a distance from the shaft portion to a tip of the retaining portion in the axial direction is greater than a length of the shaft portion in the axial direction.

Preferably, in the power transmission body mounting structure, at an opposite end from the flexible portion, the retaining portion is provided with a tip guide face inclined so that as with increasing distance from the flexible portion in the axial direction, the tip guide face approaches the third flat face in a radial direction.

Preferably, in the power transmission body mounting structure, the second hole portion in the axial hole expands to a greater degree in a radial direction than does the first hole portion.

Preferably, in the power transmission body mounting structure, the second hole portion of the axial hole is provided with an inner circumferential surface having a same diameter as an inner circumferential surface of the first hole portion.

Preferably, in the power transmission body mounting structure, the rotating shaft is provided with a flange at an opposite side of the shaft portion than the flexible portion, the flange restricting movement of the rotating shaft along the axial direction with respect to the axial hole.

Preferably, in the toner transport device, a portion of the rotating shaft is located within a through-hole, provided in the housing, for supporting the power transmission body, and the rotating shaft is provided with a flange at an opposite side of the through-hole than the retaining portion, the flange restricting movement of the rotating shaft along the axial direction with respect to the through-hole.

Preferably, in the toner transport device, a seal member is provided at a position between the flange and the housing, in engagement with the rotating shaft, to seal the through-hole.

Preferably, in the toner transport device, the shaft portion and a portion of the power transmission body that is supported within the through-hole overlap in a direction orthogonal to the axial direction.

Preferably, in the toner transport device, the power transmission body has a predetermined range of movement when moving in the axial direction with respect to the through-hole of the housing upon becoming disengaged from the retaining portion, and a length in the axial direction of a region of engagement between the shaft portion and the first hole portion is greater than a length of the range of movement of the power transmission body.

Preferably, in the toner transport device, the rotating shaft has a predetermined range of movement when moving in the axial direction with respect to the through-hole of the housing upon the retaining portion becoming disengaged from the power transmission body, and a length in the axial direction of a region of engagement between the shaft portion and the first hole portion is greater than a length of the range of movement of the rotating shaft.

The present invention is useful, in a mounting structure for mounting a power transmission body onto a rotating shaft, as a technique for preventing the power transmission body from coming free from the rotating shaft.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A power transmission body mounting structure in which a power transmission body is mounted onto an end portion of a rotating shaft, the power transmission body mounting structure comprising:

a hollow shaft and a power transmission portion provided in the power transmission body, the power transmission portion disposed at a front end of the hollow shaft, the hollow shaft having an axial hole including a first hole portion with a non-circular cross-section and a second hole portion located closer to a tip of the end portion of the rotating shaft than the first hole portion is, the second hole portion having a different cross-sectional shape than the first hole portion, the different cross-sectional shape of the second hole portion extending from the power transmission portion toward a rear end of the hollow shaft to a point between the power transmission portion and the rear end, the first hole portion extending from the point to the rear end of the hollow shaft;

a shaft portion, with a non-circular cross-section, provided in the rotating shaft and engaged with the first hole portion so as to rotate integrally with the power transmission body;

a flexible portion provided between the shaft portion and the tip of the end portion of the rotating shaft; and a retaining portion provided at the tip of the rotating shaft, having a cross-sectional shape allowing for passage through the axial hole, protruding beyond the shaft portion in a direction perpendicular to an axial direction, and engaged with an area near an end of the axial hole, wherein when the power transmission body is mounted onto the end portion of the rotating shaft, the shaft portion engages with the first hole portion after the retaining portion completely passes through the first hole portion, and while the retaining portion is passing through the second hole portion, the flexible portion contacts with the second hole portion and bends, and once the retaining portion passes completely through the axial hole, the flexible portion ceases to bend so that the retaining portion engages with the area near the end of the axial hole.

2. The power transmission body mounting structure of claim 1, wherein a guide face is provided between the flexible portion and the shaft portion to guide the shaft portion into the first hole portion when the shaft portion enters into the first hole portion.

3. The power transmission body mounting structure of claim 2, wherein the first hole portion of the axial hole is surrounded by an inner circumferential surface having a central axis coaxial with the rotating shaft and by a flat opposing face on an opposite side of the central axis than the inner circumferential surface, and the shaft portion includes a first outer circumferential surface facing the inner circumferential surface and a first flat face facing the opposing face.

4. The power transmission body mounting structure of claim 3, wherein the retaining portion has a cross-sectional shape matching a cross-sectional shape of the shaft portion.

5. The power transmission body mounting structure of claim 4, wherein the flexible portion includes a second flat face, parallel to the first flat face at a location between the first outer circumferential surface and the first flat face of the shaft portion, and a second outer circumferential surface continuous with the first outer circumferential surface, and the guide face is inclined between the second flat face of the flexible portion and the first flat face of the shaft portion so as to gradually become more distant in a radial direction from the second outer circumferential surface as the guide face approaches the first flat face from the second flat face in the axial direction.

6. The power transmission body mounting structure of claim 5, wherein along opposite sides of the central axis of the rotating shaft, the shaft portion is provided with first side faces continuous with the first outer circumferential surface and the first flat face, and the flexible portion is provided with second side faces respectively positioned along a same face as the first side faces.

7. The power transmission body mounting structure of claim 5, wherein the retaining portion includes a third flat face positioned along a same face as the second flat face in the flexible portion, and a distance from an end of the shaft portion that is closest to a tip of the retaining portion to the tip of the retaining portion in the axial direction is greater than a length of the shaft portion in the axial direction.

8. The power transmission body mounting structure of claim 7, wherein at an opposite end from the flexible portion, the retaining portion is provided with a tip guide face inclined so that as with increasing distance from the flexible portion in the axial direction, the tip guide face approaches the third flat face in a radial direction.

9. The power transmission body mounting structure of claim 1, wherein the second hole portion in the axial hole expands outwards to a greater degree in a radial direction than does the first hole portion.

10. The power transmission body mounting structure of claim 9, wherein the second hole portion of the axial hole is provided with an inner circumferential surface having a same diameter throughout as an inner circumferential surface of the first hole portion.

11. The power transmission body mounting structure of claim 1, wherein the rotating shaft is provided with a flange at an end of the shaft portion opposite the flexible portion, the flange restricting movement of the rotating shaft along the axial direction with respect to the axial hole.

12. A toner transport device comprising:

a housing that stores toner; a toner transport screw including the rotating shaft of claim 1 and a transport blade, provided on the rotating shaft, that transports toner within the housing;

the power transmission body that transmits power to the rotating shaft; and the power transmission body mounting structure of claim 1.

13. The toner transport device of claim 12, wherein the shaft portion of the rotating shaft is located within a through-hole, which is provided in the housing for supporting the power transmission body, and the rotating shaft is provided with a flange at an end of the through-hole opposite the retaining portion, the flange restricting movement of the rotating shaft along the axial direction with respect to the through-hole.

14. The toner transport device of claim 13, wherein a seal member is provided at a position between the flange and the housing, in engagement with the rotating shaft, to seal the through-hole.

15. The toner transport device of claim 13, wherein the shaft portion and a portion of the power transmission body that is supported within the through-hole overlap in a direction orthogonal to the axial direction.

16. The toner transport device of claim 15, wherein the power transmission body has a predetermined range of movement when moving in the axial direction with respect to the through-hole of the housing upon becoming disengaged from the retaining portion, and a length in the axial direction of a region of engagement between the shaft portion and the first hole portion is greater than a length of the range of movement of the power transmission body.

17. The toner transport device of claim 15, wherein
the rotating shaft has a predetermined range of movement when moving in the axial direction with respect to the through-hole of the housing upon the retaining portion becoming disengaged from the power transmission body, and a length in the axial direction of a region of engagement between the shaft portion and the first hole portion is greater than a length of the range of movement of the rotating shaft.

18. The power transmission body mounting structure of claim 1, wherein the first hole portion has a D-shaped cross-sectional shape and the second hole portion has a circular cross-sectional shape.

19. The power transmission body mounting structure of claim 1, wherein the second hole portion has a larger dimension than that of the first hole portion in a direction that is perpendicular to the axial direction and extends from a position where the retaining portion is in contact with the second hole portion through a central rotational axis of the hollow shaft.

20. The power transmission body mounting structure of claim 1, wherein the power transmission portion is a gear portion.

* * * * *